US008746638B2

(12) United States Patent
Carney

(10) Patent No.: US 8,746,638 B2
(45) Date of Patent: Jun. 10, 2014

(54) WALLET-SIZED STAND FOR MOBILE TELEPHONE

(76) Inventor: Michael H. Carney, Seattle, WA (US)

( * ) Notice: Subject to any disclaimer, the term of this patent is extended or adjusted under 35 U.S.C. 154(b) by 0 days.

(21) Appl. No.: 13/562,153

(22) Filed: Jul. 30, 2012

(65) Prior Publication Data

US 2013/0165188 A1    Jun. 27, 2013

Related U.S. Application Data

(60) Provisional application No. 61/512,835, filed on Jul. 28, 2011.

(51) Int. Cl.
*F16M 11/20* (2006.01)

(52) U.S. Cl.
USPC .............. 248/188.1; 248/441.1; 248/188.2; 248/188.3; 248/176.1; 455/575.1

(58) Field of Classification Search
CPC ................................... H04M 1/0202
USPC .............. 455/575.1; 248/558, 121; 245/176.1
See application file for complete search history.

(56) References Cited

U.S. PATENT DOCUMENTS

| | | | |
|---|---|---|---|
| 2010/0090085 A1* | 4/2010 | Corrion | 248/459 |
| 2010/0213331 A1* | 8/2010 | Liou | 248/176.3 |
| 2011/0215217 A1* | 9/2011 | De La Garza | 248/397 |
| 2012/0025036 A1* | 2/2012 | Huang | 248/122.1 |
| 2012/0074271 A1* | 3/2012 | Goetz | 248/121 |
| 2012/0083153 A1* | 4/2012 | Schmidt | 439/527 |
| 2012/0312953 A1* | 12/2012 | Moffa | 248/459 |
| 2013/0026329 A1* | 1/2013 | Lane et al. | 248/459 |

* cited by examiner

*Primary Examiner* — Allahyar Kasraian
*Assistant Examiner* — Jose M Rodriguez Colon
(74) *Attorney, Agent, or Firm* — Lowe Graham Jones PLLC

(57) ABSTRACT

A stand for engaging support of a smart mobile telephone includes a base plate formed of planar thermoplastic polymer generally rectangular in shape having a midline axis and a first and second extreme edges in opposed relationship, parallel and spaced apart from the midline axis. A first and a second flex plate formed of the planar thermoplastic polymer and include an attachment region extending from an extreme edge and to a first root edge and is fused to base plate in a manner to bias the first flex plate toward the base plate. A generally rectangular limb extends beyond the root edge to a living hinge affixed to a generally rectangular first riser defining at least one first tab being configured to engage the registration slot when the first riser is rotated to an attitude perpendicular to the base plate.

20 Claims, 6 Drawing Sheets

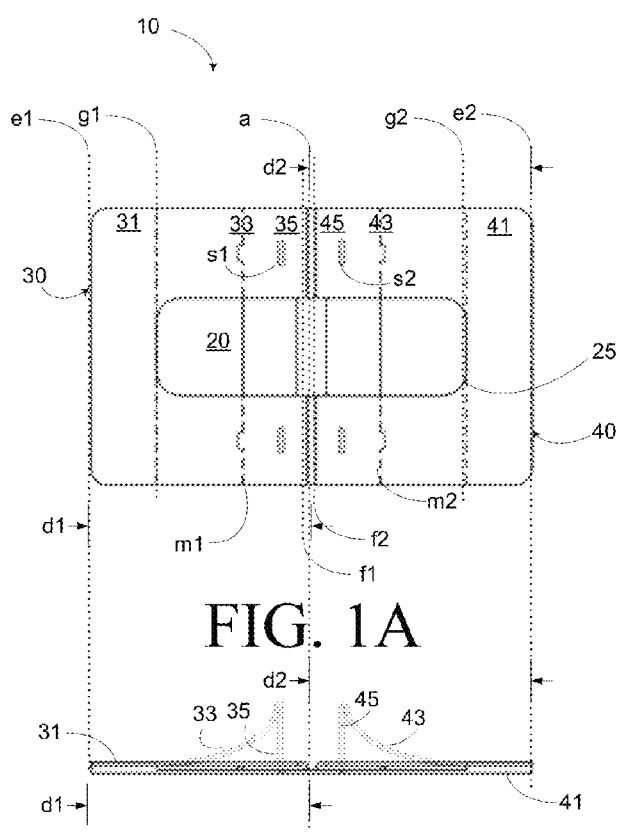
FIG. 1A
FIG. 1B
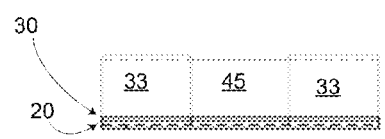
FIG. 1C

WALLET-SIZED STAND FOR MOBILE TELEPHONE

PRIORITY CLAIM

This application is a utility application claiming priority from that provisional application of the same title and having an Application Ser. No. 61/512,835 having been filed on Jul. 28, 2011. Reference to the provisional here is intended to incorporate the whole of that provisional as if fully set forth herein.

FIELD OF THE INVENTION

The present invention includes an easel-like stand.

BACKGROUND OF THE INVENTION

Mobile telephones have, over recent years, received far more powerful processors and more vivid screens with far greater resolution and color fidelity. For example, the Retina™ display Apple claims to have specified a high enough pixel density that the human eye is unable to notice pixelation at a typical viewing distance. Graphic engines that exceed those of cutting edge desktop gaming towers of five years ago are common in some recent smartphones.

Not only in the display of imagery, but also in the capture of imagery, both still and video imagery, has increased both in terms of pixel counts and color fidelity. In contrast with mobile telephones of five years ago, which cameras were limited in both the resolution and lens quality, current cameras of such high resolution and clarity, that some professional photographers have been known to use them for collection of backgrounds for augmenting other photos. Because the principal purpose of the earlier cameras had been thought to be solely for such uses as were allowed by the then-current data transfer rates over the mobile telephone's data channel, cameras were of lesser resolution (when compared to single purpose cameras) and consequently only small file size of images were thought to be advantageous in the context of such limited data capacity. While the poor image quality that resulted was recognizably poor, the camera was felt to be adequate for its intended purpose.

Changes to data transfer protocols and cheaper solid state memory has driven changes in the use of the mobile telephone over time. Rather than capturing photos of limited image size and quality, recent mobile telephone cameras are now more competent than ever; and have, for many consumers, replaced the standalone digital camera. Photos taken with a mobile telephone now account for a majority of photos and videos uploaded to social media sites such as Facebook® and YouTube®. Additionally, both through commercial outlets and through amateur channels, video content has become increasingly available for viewing on telephone platforms.

Still a further consequence of the greater capability of telephone platform has been the cornucopia of applications and games that exploit the resolution now commonly native in these devices. Thus, the telephone platform has become a near-analogue to the desktop computer, though modified by the mobility that they offer. With this increased mobile usage comes increased demand for products which assist the user in taking higher quality photography and video, namely tripods. Given their small size, mobile telephones do not include standard threads for tripod mounting. A specially-designed device is required to achieve hands-free use.

There have been some products offered for standing a cell phone in an upright position, but these have generally been as large as a compact camera itself and have, thus, surrendered the advantage that a mobile telephone camera has its mobility. None of the current offerings have either the compactness or portability that consumers seek. Ideally, just as the mobile telephone camera allows an unprecedented spontaneity in photography, the stand ought also to be so unobtrusive to carry that using it is equally spontaneous.

Additionally, given the frequent use of the mobile telephone as a monitor, both to view content and the collected photos, any such stand ought to be configured to facilitate viewing of content. Few users will tolerate watching a two hour movie on an entirely handheld device. Thus, in addition to collection of imagery, an ideal stand will facilitate the viewing of imagery.

What is missing in the art is an ultra-compact stand that is readily stowed in the user's wallet. Because a user will always carry a wallet, the configuration, size, and portability will make the stand always available thereby to be used with equal spontaneity as the mobile telephone camera it supports.

SUMMARY OF THE INVENTION

An ultra-compact stand for a mobile telephone that collapses into the shape of a credit card with overall thickness approximately less than 0.1". The stand is configured to be easily and unobtrusively stowed in the user's wallet.

BRIEF DESCRIPTION OF THE DRAWINGS

Preferred and alternative examples of the present invention are described in detail below with reference to the following drawings:

FIG. 1A is a plan view of an easel stand showing in phantom layers for a mobile telephone;

FIG. 1B is a side view of the easel stand;

FIG. 1C is a front view of the easel stand;

DETAILED DESCRIPTION OF THE PREFERRED EMBODIMENT

Figure 1D:
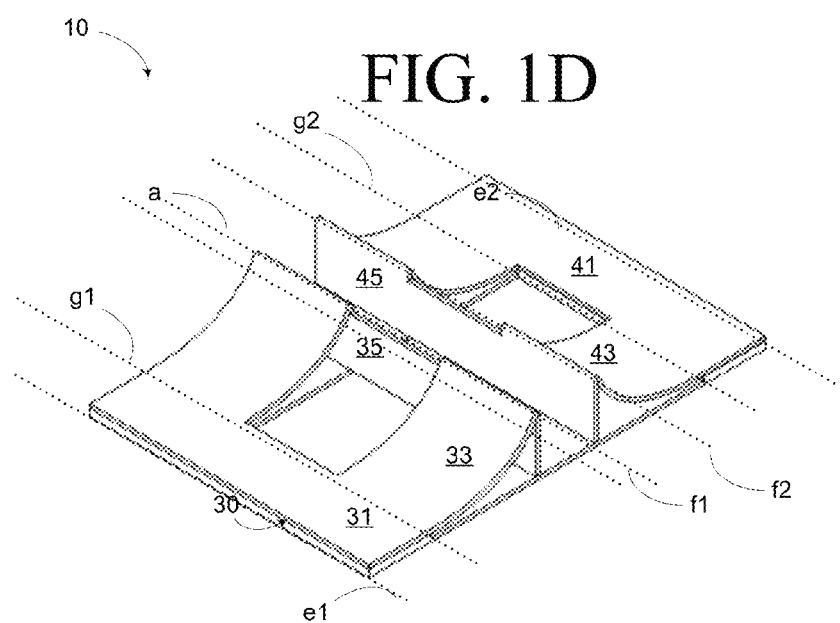
FIG. 1D is a side view of the easel stand in the deployed position.
Figure 1E:
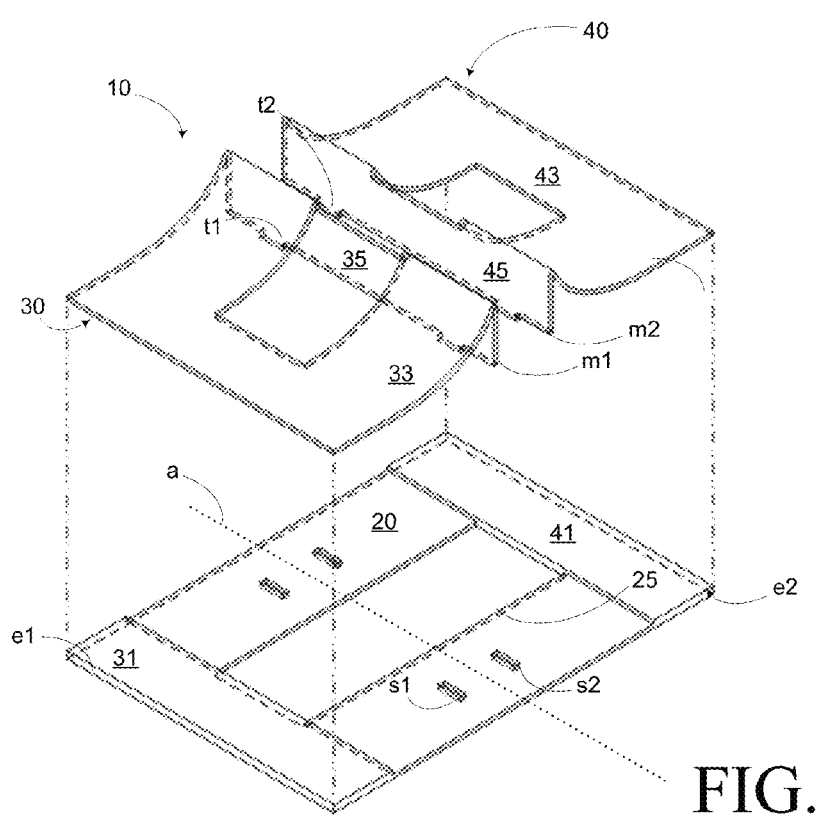
FIG. 1E is an exploded view of the easel stand in the deployed position.
Figure 1F:
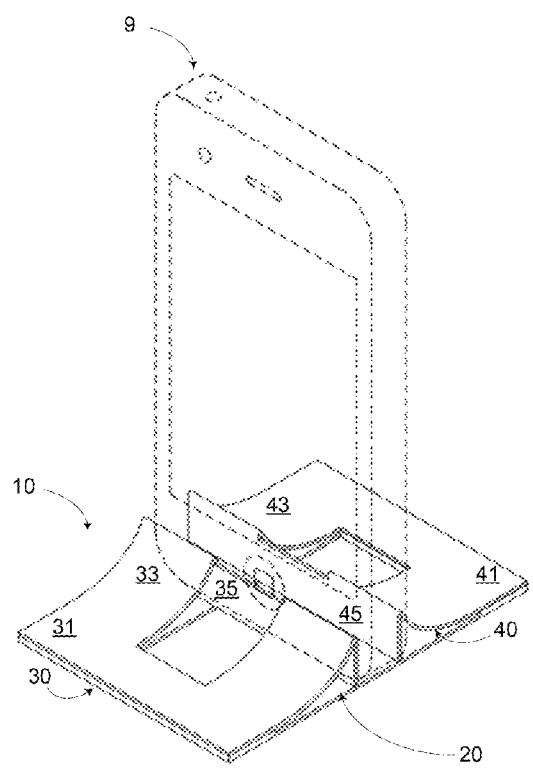
FIG. 1F is a front view of the easel stand in the deployed position with an exemplary mobile telephone.

A non-limiting and exemplary embodiment of the invention is formed of three (3) generally planar sheets of thermoplastic material. Other embodiments can be formed of planar metal or metal alloy or molded of thermoset or thermoplastic material. In the preferred embodiment, the manufacture of the stand is advantageously selected to be by assembly of a base plate 20 and two flex plates 30, 40 joined at respective extreme edges e1, e2 of the base plate 20 in a symmetric arrangement, though symmetrically disposed are not, in the best mode, exactly symmetric. Reference to FIGS. 1A, 1B, 1C, 1D, 1E, and 1F illustrate generally the relationship and disposition as between the three elements, base plate 20, first flex plate 30, and second flex plate 40 in an exemplary illustration of the presently preferred embodiment.

In the exemplary illustrations of FIGS. 1A, 1B, 1C, 1D, 1E, and 1F, the base plate is shown in its principal role in providing registration and biasing between the three elements. Generally rectangular in shape, a midline axis a bisects the base plate 20 and will, in this illustrative discussion assist in explanatory location of the elements of the inventive stand. Again, while not necessarily perfectly so, all of the elements of the inventive stand are disposed in general bilateral symmetry about the midline axis a.

In its role of registration, the base plate 20 fixes at opposed extreme edges e1, e2 attachment points 31, 41 for one each of the first and second flex plates 30, 40. The material and thickness of the base plate 20 are selected to lack tensility. Tensility would impair the base plate's 20 ability to resist the drawing force the flex plates 30, 40, when in use, exert to stretch the base plate 20. Each of the extreme edges e1, e2 is oriented to be parallel to and spaced apart from the base midline axis a by a first and a second offset distance d1, d2 corresponding to the first and the second extreme edges e1, e2 and in most embodiments these first and second offset distances d1, d2 will be equal and in all instances differences in these offsets will be small relative the magnitude of the sum of the offsets distances.

Ductility in the base plate would impede the ability of the base plate to hold the extreme edges e1, e2 at a fixed or relatively fixed offset distances d1, d2 when the flex plates in concert exert tension at the extreme edges e1, e2. Each extreme edge e1, e2 defines an outer edge of one of each of a first and a second base attachment region 31, 41 for attachment to, respectively, the first and second flex plates 30, 40.

In the presently preferred embodiment, the base plate 20 is configured of either of polyethylene or polypropylene. Polyethylene is a thermoplastic polymer consisting of long hydrocarbon chains. Polypropylene (PP), a polymer prepared catalytically from propylene which differs from HDPE by having an isostatic replacement of a hydrogen atom by a methyl group on alternate carbon atoms in the main chain. A major advantage is polypropylene's higher temperature resistance, this makes polypropylene particularly suitable for embodiments used in environments where it is desirable to sterilize the stand. Polypropylene is a translucent material with excellent mechanical properties and it has gradually replaced the polyethylenes for many purposes. In the presently preferred embodiment, the first and second flex plates 30, 40 are of the same thermoplastic material as the base plate to facilitate welding at attachment regions 31, 41.

For the purposes of explanation, the description of function of the flex plates 30, 40, will be described together, though in embodiments dimensions of the flex plates 30, 40 may vary slightly to allow such differential in height and resiliency as is necessary to facilitate the below-described tilting functions. Thus, in all other regards, the flex plates 30, 40 function identically and symmetrically. As mentioned above, the respective extreme edges e1, e2 define outer limits of regions on the base plate 20 that are the fixation sites for a first and a second attachment region 31 and 41 where the base plate 20 is fused, bonded, or otherwise fixed respectively to each of the first and second flex plates 30, 40. The attachment regions 31 and 41 are each configured to exploit stiffness of respective flex plates 30, 40. Widths between the respective extreme edges e1, e2 and defined root edges g1, g2 of the respective attachment regions 31, 41; the root edges g1, g2 being parallel to the extreme edges e1, e2, the midline axis a and the other root edges g2, g1. Widths of the attachment regions 31, 41 are selected based upon base plate 20 material qualities in order to provide sufficient resiliency to adequately tend to urge the respective flex plates 31, 41 toward the base plate 20.

A number of possible means exist to join the respective flex plates 30, 40 to the base plate 20. One presently preferred method is fusing by ultrasonic welding. In ultrasonic welding, high frequency (15 kHz to 40 kHz) low amplitude vibration is used to create heat by way of friction between the materials to be joined. The interface of the two parts is specially designed to concentrate the energy for the maximum weld strength. Ultrasonic can be used on almost all plastic material. It is the fastest heat sealing technology available. Advantageously, ultrasonic welding equipment can be easily customized to fit the exact specifications and dimensions of the flex plates 30, 40 and base plate 20 being welded. The plates 20, 30, 40 are sandwiched between a fixed shaped nest (anvil) and a sonotrode (horn) connected to a transducer, and a 20 kHz low-amplitude acoustic vibration is emitted. (Common frequencies used in ultrasonic welding of thermoplastics are 15 kHz, 20 kHz, 30 kHz, 35 kHz, 40 kHz and 70 kHz). The ultrasonic energy melts the point contact between the parts, creating a joint.

Another suitable fusion means that might be advantageously exploited is contact welding.

Heated jaws clamp the two plates pinching them, melting and joining the parts in the process. Very similar to contact welding, hot plate welding fuses two plates. A hot plate, with a shape that matches the weld joint geometry of the parts to be welded, is moved in position between the two parts. The two opposing platens move the parts into contact with the hot plate until the heat softens the interfaces to the melting point of the plastic. When this condition is achieved the hot plate is removed, and the parts are pressed together and held until the weld joint cools and re-solidifies to create a permanent bond.

Rather than heat, solvent welding can also fuse the flex plates 30, 40 to the base plate 20. In solvent welding, a solvent is applied which can temporarily dissolve the polymer at room temperature. When this occurs, the polymer chains are free to move in the liquid and can mingle with other similarly dissolved chains in the other component. Given sufficient time, the solvent will permeate through the polymer and out into the environment, so that the chains lose their mobility. This leaves a solid mass of entangled polymer chains which constitutes a solvent weld.

While the foregoing is not exhaustive as to means, the objective in fusing the flex plates 30, 40 to the base plate 20 is to bias the flex plates 30, 40 toward the base plate 20.

Extending from the respective root edges g1, g2, to their respective folding creases f1, f2, each of the flex plates 30, 40 comprises a limb 33, 43. The limbs 33, 43 are each formed as resilient members to form, as shown in FIG. 1B, catenaries when flexed by the vertical positioning of respective risers 35, 45 the flex plates 30, 40 also comprise. The respective resilient limbs store energy as they flex under both the urging of the respective attachment areas 31, 41 and the support of the risers 35, 45 when the risers are in vertical positioning. When the risers 35, 45 are allowed to return to their horizontal position, the limbs exert sufficient force to keep the entire stand 10 in a compact, flat configuration. In a preferred embodiment, the whole of the stand 10 in this nondeployed state is smaller than the volume of two standard credit cards and can be readily stored in pockets formed in wallets to accommodate such cards.

As stated above the limbs 33, 43 extend along their respective flex plates 30, 40 to the respective folding axes or creases f1, f2. At the creases f1 or f2, a living hinge joins the limbs 33, 43, to their respective risers 35, 45. A living hinge is a thin flexible hinge (flexure bearing) made from thermoplastic polymer and joining two more rigid bodies formed of the same polymeric material together, allowing them to bend along the line of the hinge. It is typically manufactured in an injection molding operation that creates all three parts at one time as a single part, and if correctly designed and constructed, it can remain functional over the life of the part. Polyethylene and polypropylene are considered to be among the best resins for living hinges, due to their excellent fatigue resistance." There are three types of hinges: a fully elastic hinge, capable of flexing several thousand cycles, a fully plastic hinge, capable of flexing only a few cycles, and a combination of plastic elastic, capable of flexing hundreds of times. The preferred embodiment includes a fully elastic hinge.

In the presently preferred embodiment, the living hinge is formed in the planar material by coining in order to have the polymer chains oriented perpendicular to the hinge as they cross it. After coining the hinges into the planar polymeric flex plates 30, 40, the hinges are generally flexed a few times immediately after coining to draw and further orient the hinge molecules. The minimal friction and very little wear in such a hinge causes the design of the instant stand to be of low cost due to ease of manufacturing. Yet, quality is not sacrifices as, properly formed, the living hinges can flex more than a million cycles without failure."

As stated above, the hinges, in their preferred embodiment are coined into the flex plates 30, 40. Coining gives the hinge helps to orient molecules across the hinge line for the hinge to have acceptable life. Coining is a form of precision stamping in which a work piece is subjected to a sufficiently high stress to induce plastic flow on the surface of the material and is accomplished by heating the hinge or the coining tool to a temperature below the glass transition temperature of the plastic. The coining process compresses the hinge to a predetermined thickness. The strain induced by such pressure is greater than the yield stress of the plastic. Thus, the pressure will plastically deform the hinge (i.e. place it outside the elastic range into the plastic range). The amount of coining (compression) should be less than the ultimate stress, to keep the hinge from fracturing. The finished thickness after coining should be from 0.25 to 0.5 mm (0.010 to 0.020 inch). This keeps the stress in the outer fibers from exceeding the yield strength when being flexed.

While not a part of the presently preferred process, the coining of the hinge may also occur during formation of the flex plates 30, 40 should the plates be formed by injection rather than by cutting planar material. With this technique a mold is only partially closed during injection. At the appropriate time and with the right amount of plastic in the mold, the clamp is then completely closed, forcing (compressing) the plastic to the shape of the mold cavity. A variation on this is coining The clamp is closed but the mold has components that compress the plastic in the cavity as the plastic cools. Coining is where the cavity volume is changing during the solidification of the plastic. Plastic is injected into the cavity and then a movable platen closes completely, or a mold component moves to compress the plastic to compensate for shrinkage or densification.

Whether the flex plates, 30, 40 are formed by cutting and coining planar material or by injection molding, the living hinge is formed along the fold axes f1, f2 of the respective flex plates 30, 40 and serves to join the limbs 33, 43 to their respective risers 35, 45 in a manner that will allow the risers 35, 45 to rotate from a horizontal to vertical orientation and as shown in FIG. 1B in phantom, when rotated into vertical position. In the vertical position, the relative incompressibility of the risers 35, 45 stand against the resilient urging of the respective limbs 33, 43, forcing the limbs into the illustrated catenary cross-sectional curves, placing a downward vertical translational force driving the risers 35, 45 into the base plate 20.

Exploiting the downward vertical translational force the risers 35, 45 exert against the base plate 20, the base plate serves a further registration function by defining at least a single slot s1, s2 to engage a tab t1, t2 each riser comprises at its respective outside edge m1, m2. Engaging and encompassing the at least one tab t1, t2 extending from each riser 35, 45, the slots s1, s2, the base plate defines fixedly holds the risers 35, 45 in their vertical orientation, thereby assuring stability when the stand 10 is configured to hold the mobile telephone 9 in an upright attitude.

The base plate is formed to additionally define a further opening 25 sized to appropriately allow a user to insert thumb and index fingers (in a preferred embodiment 0.75" width× 2.5" length) to apply suitable pressure to the outer edges of the risers 35, 45 thereby to rotate the risers from horizontal to vertical positions. Similarly, the opening 25 allows the user to place sufficient pressure to displace tabs from engagement with the slots s1, s2 to allow the resiliency of the limbs to rotate the risers from vertical to horizontal orientation, thereby allowing the stand 10 to collapse into a folded position for storage in a pocket, wallet, or purse. Instructions accompanying the product state the rotational movement thus:

To expand the device from the folded position, a user would insert the thumb and index finger into the base plate and squeeze the device to cause the tabs to slide toward the center and raise the hinged edge until the tabs of one flex plate are parallel to the other to allow engagement with the slots the base plate defines to lock the device in its deployed position.

To revert to the folded position, the user would hold the device at its outer edges and flex the base plate to release the tabs from engagement with the slots the base plate defines. The user can assist in disengaging the tabs from the base plate by the use of both thumbs to push the tabs back through the slots in the base plate. After the tabs clear the holes, the user allows the device to return to the planar or folded position.

As has been amply discussed above, embodiments of the stand 10 can be ably practiced having truly symmetric disposition of the flex plates 30, 40. Nonetheless, the presently preferred embodiment of the stand 10 uses slight differences in the height of the first riser 35 and the second riser 45 with corresponding differences in length between the first limb 33 and the second limb 43, to create but useful bias to allow adjustability in the stand. Demonstrated in FIGS. 2A and 2B, the stand 10 in this presently preferred embodiment allows the telephone 9 to rotate about its center of gravity in the stand in either of the telephone's 9 portrait or landscape attitudes. For clarity of illustration, the telephone 9 is illustrated in its landscape attitude.

Figure 2A:
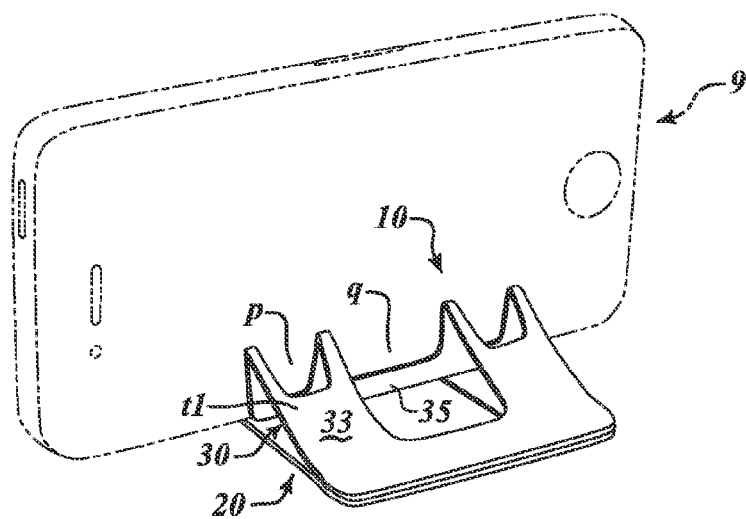
FIG. 2A is a photo of an exemplary embodiment.

Viewing specifically FIG. 2a, tabs on the first riser 35 are fully engaged in the corresponding slots s1 in the base plate 20. In a vise-like manner, the telephone 9 is held such that a front face is held at right angles to the base plate 20 in a vertical orientation. Advantageously, the riser 35 and the limbs 33 are incrementally longer than the second riser 45 (not visible) and limbs 43 (not shown). Also, in this presently preferred embodiment, the riser 35 and limbs 33 cooperate to define three apertures p and q, cut in the flex plate 30 in order to remove the greatest amount of material without compromising the strength of the limbs in retaining the telephone. Advantageously, these apertures p, q allow the user far greater visual access to the underlying screen. As is apparent, the three apertures p, q leave only small pronged riser 35 and limbs 33 obscuring the smallest area on the screen while still providing secure support to the telephone 9.

Figure 2B:
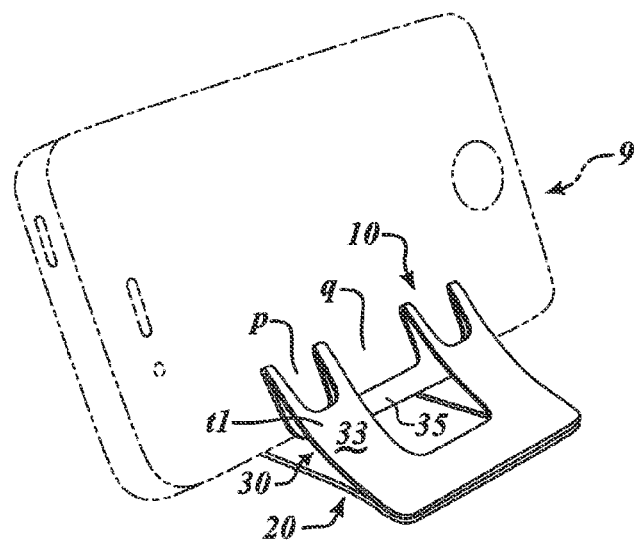
FIG. 2B is a photo of an exemplary embodiment.

Referring now to FIG. 2B, the first tabs t1 have been released from the defined first slots, s1 in the base plate 20. The stand 10 continues to securely support the telephone 9 while allowing the telephone to rotate such that the telephone can swing from a vertical some 45 degrees to an attitude such to allow the user far more comfortable viewing of the screen. Because the riser 35 and the limbs 33 are incrementally longer than the second riser 45 (not visible) and limbs 43 (not shown), the telephone 9 cannot over-rotate forward past the vertical and fall out of the stand 10. Thus, the incremental differences between the length of the first riser 35 and limb 33 and the second riser 45 and limb 43, enable the presently preferred embodiment to allow the phone to be securely support while the attitude of the telephone 9 may adjustably rotated to assure user comfort in use.

While the preferred embodiment of the invention has been illustrated and described, as noted above, many changes can be made without departing from the spirit and scope of the invention. For example, while currently illustrated using transparent polypropylene, the stand 10 can be formed of distinctly colored planar material such that, for example, supporters of the Minnesota Northstars may choose an emerald green base plate 20, and golden flex plates 30, 40, to demonstrate their loyalty. Indeed, because the fusing of the flex plates 30, 40 are the last step in assembly, vending machines might be set up to assemble stands 10 having base plates 20 and individual flex plates 30, 40 in accord with user's designated color selections and to be ultrasonically welded at the attachment regions by ultrasonic welding immediately prior to dispensing. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A stand for engaging support of a smart mobile telephone, the stand comprising:
   a base plate formed of planar thermoplastic polymer generally rectangular in shape having a midline axis and a first extreme edge and a second extreme edge in opposed relationship, parallel to and spaced apart from the midline axis, the base plate defining at least one of each of a first registration slot and a second registration slot;
   a first flex plate formed of the planar thermoplastic polymer and including:
      a first attachment region, the first attachment region extending from the first extreme edge and to a first root edge, the first attachment region being fused to the base plate in a manner to bias the first flex plate toward the base plate;
      a first limb, generally in a rectangular form, extending beyond the first root edge to a first living hinge extending parallel to and in opposed relation to the first extreme edge;
      a first riser, generally in a rectangular form, having a first outside edge, the first outside edge defining at least one first tab, the at least one first tab being configured to engage the at least one first registration slot when the first riser is rotated to an attitude perpendicular to the base plate;
      the first living hinge joining the first limb to the first riser allowing the first riser to rotate from an attitude parallel to the base plate to the attitude perpendicular to the base plate; and
   a second flex plate formed of the planar thermoplastic polymer and including:
      a second attachment region, the second attachment region extending from the second extreme edge and to a second root edge, the second attachment region being fused to the base plate in a manner to bias the second flex plate toward the base plate;
      a second limb, generally in a rectangular form, extending beyond the second root edge to a second living hinge extending parallel to and in opposed relation to the second extreme edge;
      a second riser, generally in a rectangular form, having a second outside edge, the second outside edge defining at least one second tab, the at least one second tab being configured to engage the at least one second registration slot when the second riser is rotated to an attitude perpendicular to the base plate;
      the second living hinge joining the second limb to the second riser allowing the second riser to rotate from an attitude parallel to the base plate to the attitude perpendicular to the base plate;
      the first flex plate and the second flex plate being capable, when the first riser and the second riser are rotated to be perpendicular to the base plate of engagingly supporting the smart mobile telephone on the base plate and held by and between the first riser and the second riser.

2. The stand of claim 1, wherein the thermoplastic polymer is selected from a polymer group comprising polyethylene and polypropylene.

3. The stand of claim 1, wherein the stand having the first riser and the second riser rotated to the parallel attitude has a collective thickness of approximately 3/32ths of an inch and a collective length of approximately 2⅞ths inches in a direction perpendicular to the midline axis and approximately 2⅛th inches along the midline axis.

4. The stand of claim 1, wherein an offset distance between each of the first extreme edge and the second extreme edge and the midline axis is equal.

5. The stand of claim 1, wherein the first flex plate, the first limb and the first riser are approximately 10% larger than each of the corresponding second flex plate, second limb and second riser.

6. The stand of claim 5, wherein the at least one tab of the first riser is released from engaging the first registration slot the base plate defines thereby allowing the smart mobile telephone to rotate between an approximately vertical attitude to any attitude less than forty five degrees from vertical while the stand engagingly supports the smart mobile telephone.

7. The stand of claim 1, wherein the base plate additionally defines an opening of sufficient dimensions to allow a user to reach through the base plate with thumb and forefinger to engage and to disengage the at least one first tab relative to the at least one first registration slot and the at least one second tab relative to the at least one second registration slot.

8. The stand of claim 7, wherein each of the first riser and the second riser additionally define a flap to extend through the opening when each of the first riser and the second riser are in perpendicular relationship to the base plate.

9. The stand of claim 1, wherein the at least one of first limb cooperating with the first riser and the second limb cooperating with the second riser further defines at least one aperture to reduce profile of the first limb cooperating with the first riser and the second limb cooperating with the second riser as they support the smart mobile telephone.

10. A method for forming a stand for a telephone comprising:
   cutting from a generally planar sheet of thermoplastic polymer a base plate and a first flex plate and a second flex plate, wherein the base plate, the first flex plate and the second flex palate are generally in rectangular forms, each of the first flex plate and the second flex plate being further the first flex plate being configured to define a first tab at a first outside edge, the second flex plate being configured to define a second tab at a second outside edge, and the base plate to include a first extreme edge and a second extreme edge in opposed relationship, parallel to and spaced apart from the midline axis, the base plate defining at least one of each of a first registration slot and a second registration slot;

coining a living hinge in each of the first flex plate and second flex plate, the location of the coining being selected to suitably divide the first flex plate into a first riser including the first tab the first outside edge defines and a first limb and the second flex plate into a second riser including the second tab the second outside edge defines and a second limb;

arranging the first flex plate such that the first flex plate is aligned at an edge opposite the defined first tab to align with the first extreme edge and the second flex plate is aligned at an edge opposite the second defined tab to align with the second extreme edge of the base plate; and fusing the first flex plate at a first attachment region and the second flex plate at a second attachment region such that the first limb and the second limb are biased toward the base plate when the first riser and the second riser are rotated about each living hinge to an attitude parallel to the base plate.

11. The method of claim 10, wherein the thermoplastic polymer is selected from a polymer group comprising polyethylene and polypropylene.

12. The method of claim 10, wherein the stand having each of the first riser and the second riser rotated to the parallel attitude has a collective thickness of approximately $3/32$ths of an inch and a collective length of approximately $2 7/8$ths inches in a direction perpendicular to the midline axis and $2 1/8^{th}$ inches along the midline axis.

13. The method of claim 10, to include additionally:
cutting the base plate to additionally define an opening of sufficient dimensions to allow a user to reach through the base plate with thumb and forefinger to engage and to disengage the at least one first tab relative to the at least one first slot and the at least one second tab relative to the at least one second slot.

14. The method of claim 13, to include additionally:
cutting the first riser to additionally define a first flap and the second riser to additionally define a second flap each to extend through the opening when each of the first riser and the second riser are in perpendicular relationship to the base plate.

15. The method of claim 10, to include additionally:
cutting the first limb and first riser and the second limb and the second riser to further define apertures to reduce the profile of the each of the first limbs and first riser and the second limb and the second riser as they support the telephone.

16. The method of claim 10, wherein cutting is selected from a cutting group consisting of laser cutting, water jet cutting, stamping, hot knife cutting.

17. The method of claim 10, wherein fusing is selected from a fusing group consisting of ultrasonic welding, solvent welding, hot plate welding, and contact welding.

18. The method of claim 10, wherein dimensions of the base plate and the first flex plate and the second flex plate are selected such that the stand when formed and having the first riser and the second riser rotated to the parallel attitude has a collective thickness of approximately $3/32$ths of an inch and a collective length of approximately $2 7/8$ths inches in a direction perpendicular to the midline axis and $2 1/8^{th}$ inches along the midline axis.

19. A method for erecting a stand for a mobile telephone, the method comprising:
rotating from an attitude generally parallel to a base plate to an attitude generally perpendicular to the base plate, each of a first riser, generally in a rectangular form, about of a first living hinge joining the first riser to a first limb and a second riser, generally in a rectangular form, about a second living hinge joining the second riser to a second limb, the first limb and the second limb being fused to the base plate at respective opposed extreme edges;

inserting a first tab formed at a first outside edge of the first riser into a first registration slot the base plate defines and inserting a second tab formed at a second outside edge of the second riser into a second registration slot the base plate defines, thereby placing the first limb and the second limb in a stored energy position driving the first tab into engagement with the first registration slot and the second tab into engagement with the second registration slot; and inserting the mobile telephone into an interspace the first riser and second riser form in cooperation with the base plate, thereby to engagingly support the mobile telephone.

20. The method of claim 19 wherein the inserting the first tab and the second tab includes reaching through an opening in the base plate configured to admit a thumb and forefinger to, in opposed movement, drive the first tab into the first registration hole and the second tab into the second registration hole the base defines.

* * * * *